United States Patent
Chen et al.

(10) Patent No.: US 12,498,415 B2
(45) Date of Patent: Dec. 16, 2025

(54) INTEGRATED CIRCUIT, TESTING SYSTEM, AND OPERATING METHOD THEREOF

(71) Applicant: VIA LABS, INC., New Taipei (TW)

(72) Inventors: Yi-Te Chen, New Taipei (TW); Cheng Jun Yeh, New Taipei (TW); Hsiao-Chyi Lin, New Taipei (TW)

(73) Assignee: VIA LABS, INC., New Taipei (TW)

( * ) Notice: Subject to any disclaimer, the term of this patent is extended or adjusted under 35 U.S.C. 154(b) by 443 days.

(21) Appl. No.: 18/325,099

(22) Filed: May 29, 2023

(65) Prior Publication Data
US 2024/0219458 A1    Jul. 4, 2024

(30) Foreign Application Priority Data
Jan. 3, 2023 (TW) ................................. 112100050

(51) Int. Cl.
*G01R 31/28* (2006.01)
*G06F 11/36* (2025.01)
*G06F 11/3668* (2025.01)

(52) U.S. Cl.
CPC ...... *G01R 31/2889* (2013.01); *G06F 11/3684* (2013.01); *G06F 11/3688* (2013.01)

(58) Field of Classification Search
CPC ............. G06F 11/3688; G06F 11/3684; G01R 31/2889
See application file for complete search history.

(56) References Cited

U.S. PATENT DOCUMENTS 8,327,195 B1 * 12/2012 Qian .................. H04L 25/03057
714/704
8,451,883 B1 * 5/2013 Ding ...................... H04L 1/203
375/228

(Continued)

FOREIGN PATENT DOCUMENTS

| CN | 108535631 | 9/2018 |
| CN | 113868064 | 12/2021 |

OTHER PUBLICATIONS

"Office Action of Taiwan Counterpart Application", issued on Sep. 13, 2023, p. 1-p. 7.

*Primary Examiner* — Eman A Alkafawi
*Assistant Examiner* — Suresh K Rajaputra
(74) *Attorney, Agent, or Firm* — JCIPRNET

(57) ABSTRACT

An integrated circuit (IC), a testing system, and an operating method are provided. The IC includes a receiver circuit and a processing circuit. The receiver circuit processes a communication signal based on a setting threshold voltage and multiple current operating parameters. The processing circuit obtains at least one current parameter among the current operating parameters. When a host inquires the IC about a receiver margin for the communication signal, the processing circuit obtains eye height data corresponding to the current parameter from a parameter-to-eye height mapping relationship, and returns the receiver margin corresponding to the eye height data to the host. A testing device of the testing system calculates the eye height data based on a setting testing threshold voltage and a target parameter corresponding to a test signal, and generates the parameter-to-eye height mapping relationship based on the target parameter and the eye height data.

30 Claims, 6 Drawing Sheets

(56) References Cited

U.S. PATENT DOCUMENTS

| | | | |
|---|---|---|---|
| 8,744,012 B1 * | 6/2014 | Ding | G01R 31/31711 375/316 |
| 2003/0051086 A1 * | 3/2003 | Smith | H02H 1/00 714/E11.154 |
| 2010/0250915 A1 * | 9/2010 | La Fetra | G06F 11/3409 713/100 |
| 2022/0156206 A1 | 5/2022 | Fayneh et al. | |
| 2022/0163587 A1 | 5/2022 | Froelich et al. | |

* cited by examiner

INTEGRATED CIRCUIT, TESTING SYSTEM, AND OPERATING METHOD THEREOF

CROSS-REFERENCE TO RELATED APPLICATION

This application claims the priority benefit of Taiwan application serial no. 112100050, filed on Jan. 3, 2023. The entirety of the above-mentioned patent application is hereby incorporated by reference herein and made a part of this specification.

BACKGROUND

Technical Field

The disclosure relates to an integrated circuit, and in particular relates to an integrated circuit applied to high-speed transmission, a testing system, and an operating method thereof.

Description of Related Art

The interface standards for connecting a computer system and peripheral devices are divided into various specifications, such as peripheral component interconnect express (PCIe) 5.0 or universal serial bus 4 (USB4). Generally speaking, the device side needs to provide a receiver margin to the signal-emitting host side (for example, the computer system) without interrupting the signal transmission of the receiver circuit.

Generally speaking, the device side respectively processes the communication signal from the host side and detects and reports the receiver margin of the communication signal through two sets of receiver circuits. The receiver margin is regulated in the interface standard, so the receiver margin is not repeated here. However, the configuration of the two sets of receiver circuits increases the power consumption of the transmission interface and increases the capacitive load on the transmission path of the communication signal to reduce the working performance.

It should be noted that the content of the "Description of Related Art" section is used to help understand the disclosure. Some (or all) of the content disclosed in the "Description of Related Art" section may not be known to persons with ordinary skill in the art. The content disclosed in the "Description of Related Art" does not mean that the content has been known to persons with ordinary skill in the art before the application of the disclosure.

SUMMARY

The disclosure provides an integrated circuit, which can return a receiver margin of a receiver circuit to a host.

An integrated circuit according to an embodiment of the disclosure includes a receiver circuit and a processing circuit. The receiver circuit receives a communication signal output by a host. The receiver circuit processes the communication signal based on a setting threshold voltage and multiple current operating parameters. The processing circuit is coupled to the receiver circuit to obtain at least one current parameter among the current operating parameters. When the host inquires the integrated circuit about a receiver margin for the communication signal, the processing circuit obtains eye height data corresponding to the current parameter from a parameter-to-eye height mapping relationship, and returns the receiver margin corresponding to the eye height data to the host.

An embodiment of the disclosure also provides an operating method of an integrated circuit. The operating method includes the following steps. A communication signal output by a host is received through a receiver circuit of the integrated circuit. The communication signal is processed based on a setting threshold voltage and multiple current operating parameters through the receiver circuit. At least one current parameter among the current operating parameters is obtained through a processing circuit of the integrated circuit. When the host inquires the integrated circuit about a receiver margin for the communication signal, eye height data corresponding to the current parameter is obtained from a parameter-to-eye height mapping relationship, and the receiver margin corresponding to the eye height data is returned to the host through the processing circuit.

An embodiment of the disclosure also provides a testing system. The testing system includes a testing device and an integrated circuit. The integrated circuit is coupled to the testing device. The integrated circuit sequentially receives at least one test signal output by the testing device. The integrated circuit processes the test signal based on a setting testing threshold voltage and multiple operating parameters, and returns at least one target parameter among the operating parameters to the testing device. The testing device calculates eye height data based on the setting testing threshold voltage and the target parameter corresponding to the test signal. The testing device generates a parameter-to-eye height mapping relationship based on the target parameter and the eye height data.

An embodiment of the disclosure also provides an operating method of a testing system. The operating method includes the following steps. At least one test signal output by a testing device of the testing system is sequentially received through an integrated circuit of the testing system. The test signal is processed based on a setting testing threshold voltage and multiple operating parameters, and at least one target parameter among the operating parameters is returned to the testing device through the integrated circuit. Eye height data is calculated based on the setting testing threshold voltage and the target parameter corresponding to the test signal through the testing device. A parameter-to-eye height mapping relationship is generated based on the target parameter and the eye height data through the testing device.

Based on the above, in a test mode of a sample to be tested (the integrated circuit), the testing device of the testing system may provide one or more test signals to the integrated circuit, and the integrated circuit may return the target parameter (a receiver operating parameter of the integrated circuit) corresponding to each test signal to the testing device. The testing device may generate the parameter-to-eye height mapping relationship based on the target parameter of the integrated circuit, and store the parameter-to-eye height mapping relationship in the integrated circuit. In a normal working mode, the integrated circuit may process the communication signal from the host through the same receiver circuit while providing information (that is, the current parameter of the receiver circuit) about the receiver margin. The integrated circuit may convert the current parameter into the eye height data based on the parameter-to-eye height mapping relationship, and return the receiver margin corresponding to the eye height data to the host.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
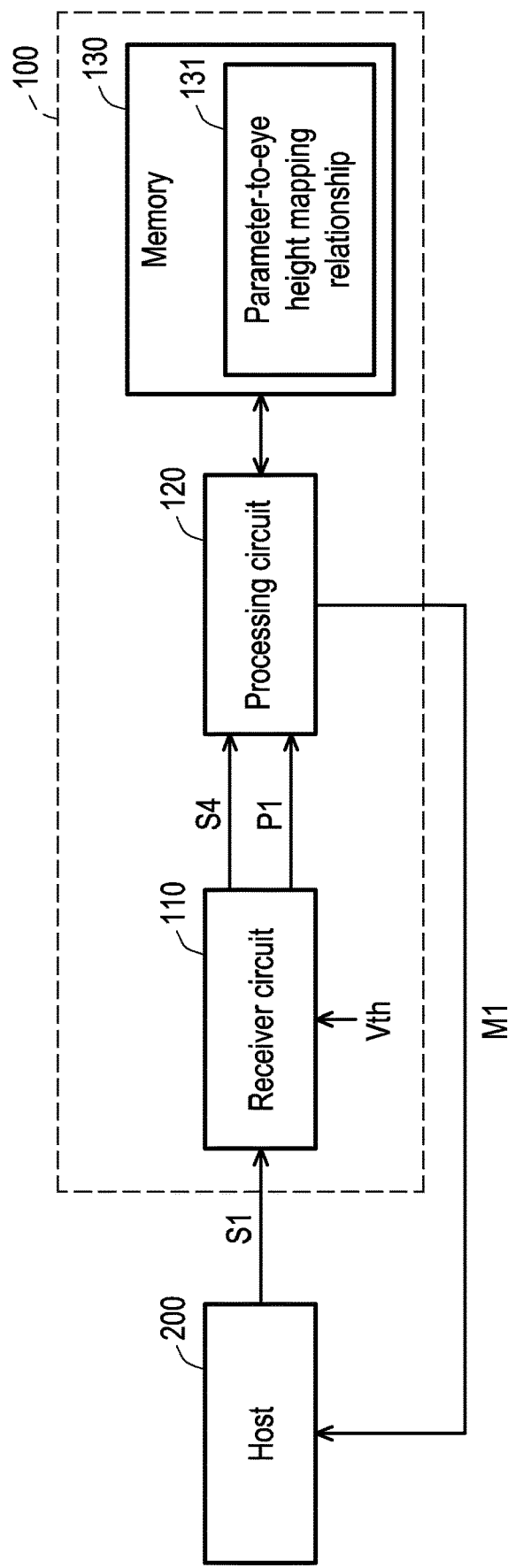
FIG. 1 is a schematic diagram of a circuit block of an integrated circuit according to an embodiment of the disclosure.

Some embodiments of the disclosure will be described in detail with reference to the drawings. For the reference numerals referenced in the following description, the same reference numerals in different drawings will be regarded as referring to the same or similar elements. The embodiments are only a part of the disclosure and do not reveal all possible implementation manners of the disclosure. Rather, the embodiments are only examples within the scope of the claims of the disclosure.

FIG. 1 is a schematic diagram of a circuit block of an integrated circuit 100 according to an embodiment of the disclosure. According to the actual design, an interface standard between a host 200 and the integrated circuit 100 may include peripheral component interconnect express (PCIe) 5.0, universal serial bus 4 (USB4), or other communication interfaces. For example, the integrated circuit 100 may be a USB4 hub or a USB4 device. In the embodiment shown in FIG. 1, the integrated circuit 100 may operate in a normal working mode to receive and process a communication signal S1 from the host 200. When the host 200 inquires the integrated circuit 100 about a receiver margin for the communication signal S1, the integrated circuit 100 may return a corresponding receiver margin M1 to the host 200.

In some operating scenarios, the integrated circuit 100 may operate in a test mode to conduct a test according to a test signal conforming to a high-speed transmission standard, and establish a "parameter-to-eye height mapping relationship" 131 about the receiver margin M1. For example, the integrated circuit 100 may operate in the test mode in a testing system (for example, the following embodiments related to FIG. 4 and FIG. 5). The implementation manner of the parameter-to-eye height mapping relationship 131 may be determined based on the actual design. For example, in some embodiments, the parameter-to-eye height mapping relationship 131 may be implemented as a lookup table. In other embodiments, the parameter-to-eye height mapping relationship 131 may be implemented as an equation. For the operation of the integrated circuit 100 in the test mode, reference may be made to the relevant description of an integrated circuit 500 in the embodiments shown in FIG. 4 and FIG. 5.

In the operating scenario shown in FIG. 1, the integrated circuit 100 may operate in the normal working mode. The integrated circuit 100 includes a receiver circuit 110, a processing circuit 120, and a memory 130. In the embodiment shown in FIG. 1, the receiver circuit 110 may receive and process the communication signal S1 output by the host 200. The receiver circuit 110 may transmit the processed communication signal S1 (data S4) to another-level circuit (for example, the processing circuit 120) in the integrated circuit 100. In the embodiment, the receiver circuit 110 may be, for example, a high-end receiver. In the embodiment, the communication signal S1 may be, for example, a high-speed differential signal conforming to PCIe 5.0, USB4, or other transmission standards. The communication signal S1 may be, for example, any form of high-speed differential signal, such as a non-return-to-zero (NRZ) signal, a three-level pulse-amplitude modulation (PAM) signal (that is, a PAM-3 signal), or a PAM-4 signal.

In the embodiment, the communication signal S1 and/or the communication signal processed by the receiver circuit 110 may be exemplarily presented as an eye diagram. Eye width data and eye height data shown in the eye diagram in a unit interval (UI) may be used as references for evaluating the signal quality. The greater the value of the eye width data and/or the eye height data (that is, the greater the eye opening), the better the signal quality. In the embodiment, the eye height data of the processed communication signal S1 is related to the receiver margin M1, and the receiver margin M1 may represent a voltage margin of the current communication signal S1. The embodiment does not limit the implementation details of the receiver margin M1. According to the actual design, in some application examples, the receiver margin M1 may be a receiver margin regulated in an interface standard.

In the embodiment, the processing circuit 120 is coupled to the receiver circuit 110, the host 200, and the memory 130. The processing circuit 120 may monitor the operating parameters of the receiver circuit 110. In the embodiment, the processing circuit 120 may process the communication operation between the integrated circuit 100 and the host 200, and return the receiver margin M1 to the host 200 through a general-purpose input/output (GPIO) interface or other transmission interfaces (not shown in FIG. 1).

As an example, the memory 130 is configured in the integrated circuit 100 in the embodiment shown in FIG. 1. In some other embodiments, the memory 130 may be another integrated circuit located outside the integrated circuit 100. According to the actual design, in some embodiments, the memory 130 is, for example, a non-volatile random access memory (NVRAM) such as a flash memory or other non-transitory storage circuits. In the test mode, an external device (for example, a testing device, a production line device, or other equipment) may pre-store the parameter-to-eye height mapping relationship 131 in the memory 130. In the normal working mode, the memory 130 may provide the parameter-to-eye height mapping relationship 131 to the processing circuit 120. The parameter-to-eye height mapping relationship 131 records the mapping (or correspondence) relationship between a certain (or some) operating parameters of the receiver circuit 110 and the eye height data of the processed communication signal.

Figure 2:
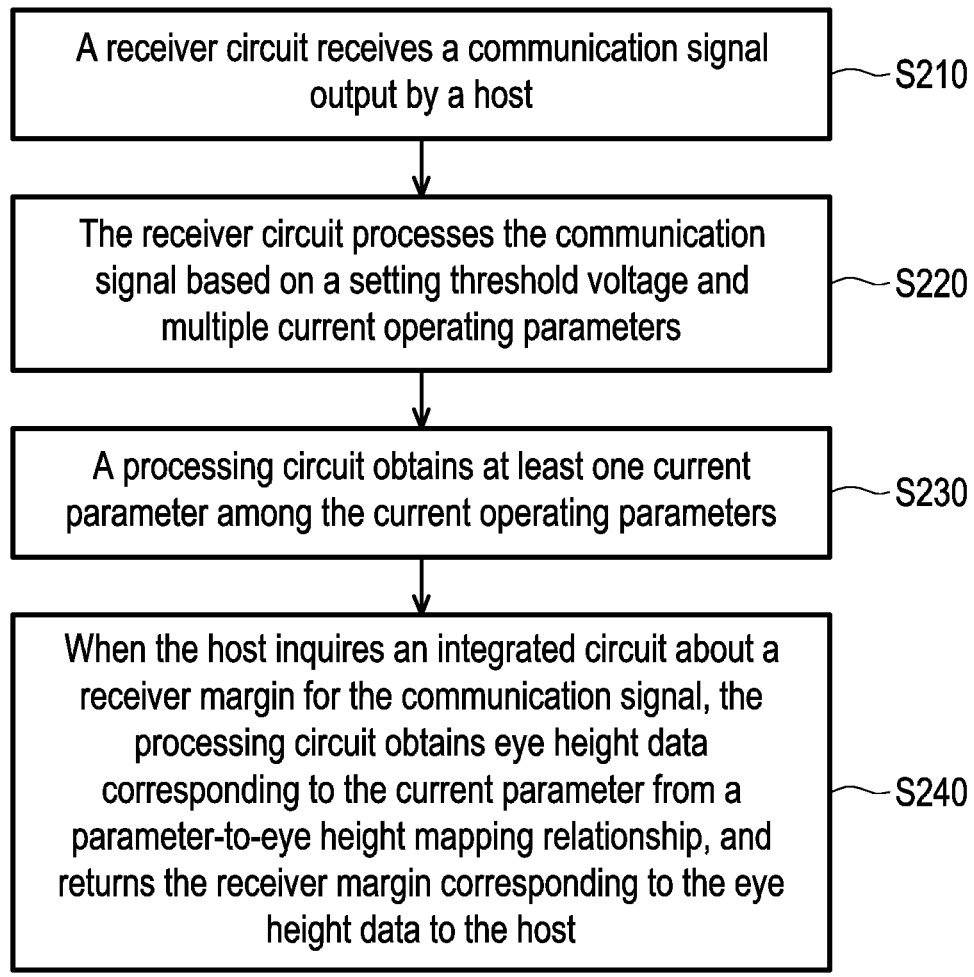
FIG. 2 is a schematic flowchart of an operating method of an integrated circuit according to an embodiment of the disclosure.

FIG. 2 is a schematic flowchart of an operating method of an integrated circuit in a normal working mode according to an embodiment of the disclosure. Please refer to FIG. 1 and FIG. 2. The integrated circuit 100 may execute Steps S210 to S240 below. In Step S210, the receiver circuit 110 may receive the communication signal S1 output by the host 200. In Step S220, the receiver circuit 110 may process the communication signal S1 based on a setting threshold voltage Vth and multiple current operating parameters (not shown in FIG. 1). For example, the receiver circuit 110 may perform filtering, equalization, amplification, data restoration, and/or other operations on the communication signal S1, and the current operating parameters may include a filtering parameter, an equalization parameter, a gain parameter, a data restoration parameter, and/or other operating parameters. In the embodiment, the setting threshold voltage Vth may be, for example, a voltage set by a user or a fixed voltage preset at the factory. For example, the setting threshold voltage Vth may be 300 millivolts (mV) or other fixed voltage levels. The receiver circuit 110 may dynamically determine the gain parameter and/or the equalization parameter based on the fixed setting threshold voltage Vth, and process the communication signal S1 with the gain parameter and/or the equalization parameter.

In Step S230, the processing circuit 120 may monitor and obtain at least one current parameter P1 among the current operating parameters of the receiver circuit 110. In the embodiment, the current parameter P1 may be, for example, a parameter used by a certain level or a certain multi-level circuit in the receiver circuit 110 when currently operating. For example (but not limited thereto), the current parameter P1 may include the equalization parameter used by the receiver circuit 110 in Step S220 to perform an equalization operation and/or the gain parameter used to perform an amplification operation. When the host 200 inquires the integrated circuit 100 about the receiver margin M1 for the communication signal S1, the processing circuit 120 may obtain eye height data corresponding to the current parameter P1 from the parameter-to-eye height mapping relationship 131, and return the receiver margin M1 corresponding to the eye height data to the host 200 (Step S240).

For example, in some embodiments, the parameter-to-eye height mapping relationship 131 may be implemented as a lookup table corresponding to the setting threshold voltage Vth. For example. Table (1) below may be used as a specific example of the lookup table. The lookup table shown in Table (1) includes at least an operating parameter column and an eye height data column. Values shown in the operating parameter column represent values of the current parameter P1 (for example, the equalization parameter and/or the gain parameter) of the receiver circuit 110. Values shown in the eye height data column represent values of the eye height data of the communication signal processed by the receiver circuit 110. The data structure, the number of fields, and the number of values in each field of Table (1) are exemplary only and are not limited thereto.

TABLE 1

Specific example of lookup table

| Operating parameter column | Eye height data column (unit: mV) |
|---|---|
| 15 | 544 |
| 17 | 444 |
| 19 | 344 |
| 25 | 244 |
| 31 | 144 |

The processing circuit 120 may obtain the current parameter P1 (for example, the gain parameter) of the receiver circuit 110. When the host 200 inquires the integrated circuit 100 about the receiver margin M1 for the communication signal S1, the processing circuit 120 may obtain the eye height data corresponding to the current parameter P1 from the lookup table (the parameter-to-eye height mapping relationship 131) shown in Table (1). For example, assuming that the current parameter P1 of the receiver circuit 110 is "19", the processing circuit 120 may obtain the corresponding eye height data of "344 mV" from Table (1). The processing circuit 120 may return the receiver margin M1 corresponding to the eye height data of "344 mV" to the host 200.

In other embodiments, the parameter-to-eye height mapping relationship 131 may be implemented as at least one equation corresponding to the setting threshold voltage Vth. For example, the parameter-to-eye height mapping relationship 131 may be implemented as equations shown in Formula (1) to Formula (3) below. In Formula (1) to Formula (3), x is the value of the current parameter P1, and y is the value of the eye height data of the communication signal processed by the receiver circuit 110. The processing circuit 120 may substitute x (the current parameter P1) into Formula (1) to Formula (3) to obtain the eye height data y. Formula (1) to Formula (3) are exemplary only and are not limited thereto.

$$y = 544, \quad x < 15 \qquad \text{Formula (1)}$$

$$y = 544 - 50 \times (x - 15), \quad 15 < x < 19 \qquad \text{Formula (2)}$$

$$y = 344 - \frac{100}{6} \times (x - 19), \quad x > 19 \qquad \text{Formula (3)}$$

For example, it is assumed that the processing circuit 120 obtains the current parameter P1 (for example, the gain parameter) of the receiver circuit 110 as "19". When the host 200 inquires the integrated circuit 100 about the receiver margin M1 for the communication signal S1, the processing circuit 120 may obtain that the corresponding eye height data y=544−50*(19−15)=344 mV from Formula (2). The processing circuit 120 may return the receiver margin M1 corresponding to the eye height data of "344 mV" to the host 200.

It is worth mentioning here that the integrated circuit may process the communication signal S1 from the host 200 through the same receiver circuit 110 while providing information (that is, the current parameter P1 of the receiver circuit 110) about the receiver margin M1 to the processing circuit 120. The processing circuit 120 may convert the current parameter P1 into the eye height data based on the parameter-to-eye height mapping relationship 131, and report the receiver margin M1 corresponding to the eye height data back to the host 200. In this way, the integrated circuit 100 may reduce an additional set of receiver circuit for providing the receiver margin M1, thereby reducing the capacitive load on the transmission path of the communication signal S1 when working to improve the working performance, so as to save the power consumption and reduce the cost.

Figure 3:
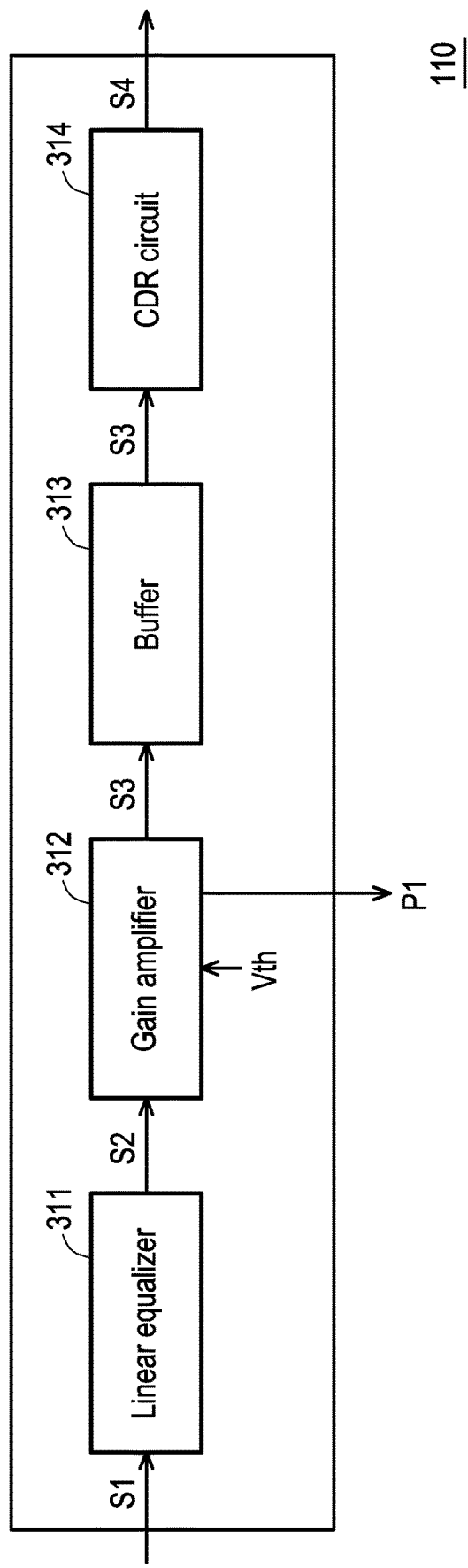
FIG. 3 is a schematic diagram of a circuit block of a receiver circuit according to an embodiment of the disclosure.

FIG. 3 is a schematic diagram of a circuit block of the receiver circuit 110 according to an embodiment of the disclosure. The receiver circuit 110 shown in FIG. 3 may be used as an implementation example of the receiver circuit 110 shown in FIG. 1. Please refer to FIG. 1 and FIG. 3. The receiver circuit 110 may include a linear equalizer 311, a gain amplifier 312, a buffer 313, and a clock and data recovery (CDR) circuit 314. The linear equalizer 311, the gain amplifier 312, the buffer 313, and the CDR circuit 314 are sequentially coupled between the host 200 and the processing circuit 120. In some embodiments, the buffer 313 may be omitted.

In the embodiment, the current operating parameters of the receiver circuit 110 include the equalization parameter of the linear equalizer 311. The linear equalizer 311 may receive and equalize the communication signal S1 to generate an equalized signal S2. The linear equalizer 311 may perform an equalization operation based on the current equalization parameter. The embodiment does not limit the specific implementation manner of the linear equalizer 311. For example, the linear equalizer 311 may include a continuous time linear equalizer (CTLE) or other equalizers.

In the embodiment, the current operating parameters of the receiver circuit 110 include the gain parameter of the gain amplifier 312. The gain amplifier 312 is coupled to the linear equalizer 311 to receive the equalized signal S2. In the embodiment, the gain amplifier 312 may be, for example, a variable gain amplifier (VGA) or other amplifiers. The gain amplifier 312 may dynamically determine the gain parameter according to the relationship between the equalized signal S2 and the setting threshold voltage Vth. The gain amplifier 312 may amplify the equalized signal S2 according to the gain parameter to generate an amplified signal S3 to the buffer 313. The buffer 313 may transmit the amplified signal S3 to the CDR circuit 314.

In the embodiment, the higher the value of the gain parameter of the gain amplifier 312, the greater the amplification factor of the equalized signal S2. The gain amplifier 312 may dynamically determine the gain parameter to amplify the equalized signal S2 to increase the eye height of the processed communication signal (that is, the amplified signal S3).

The CDR circuit 314 is coupled to the gain amplifier 312 through the buffer 313 to receive the amplified signal S3. The CDR circuit 314 may recover the data S4 in the amplified signal S3 based on the data restoration parameter (for example, a phase parameter), and provide the data S4 to another-level circuit (for example, the processing circuit 120) in the integrated circuit 100.

As a concise implementation example, the receiver circuit 110 shown in FIG. 3 transmits the gain parameter of the gain amplifier 312 to the processing circuit 120 as the current parameter P1. In any case, the specific implementation manner of the current parameter P1 should not be limited to the embodiment shown in FIG. 3. For example, in some other embodiments, the receiver circuit 110 may transmit the equalization parameter of the linear equalizer 311 to the processing circuit 120 as the current parameter P1. In some other embodiments, the receiver circuit 110 may transmit the equalization parameter of the linear equalizer 311 and the gain parameter of the gain amplifier 312 to the processing circuit 120 as the current parameters P1.

Figure 4:
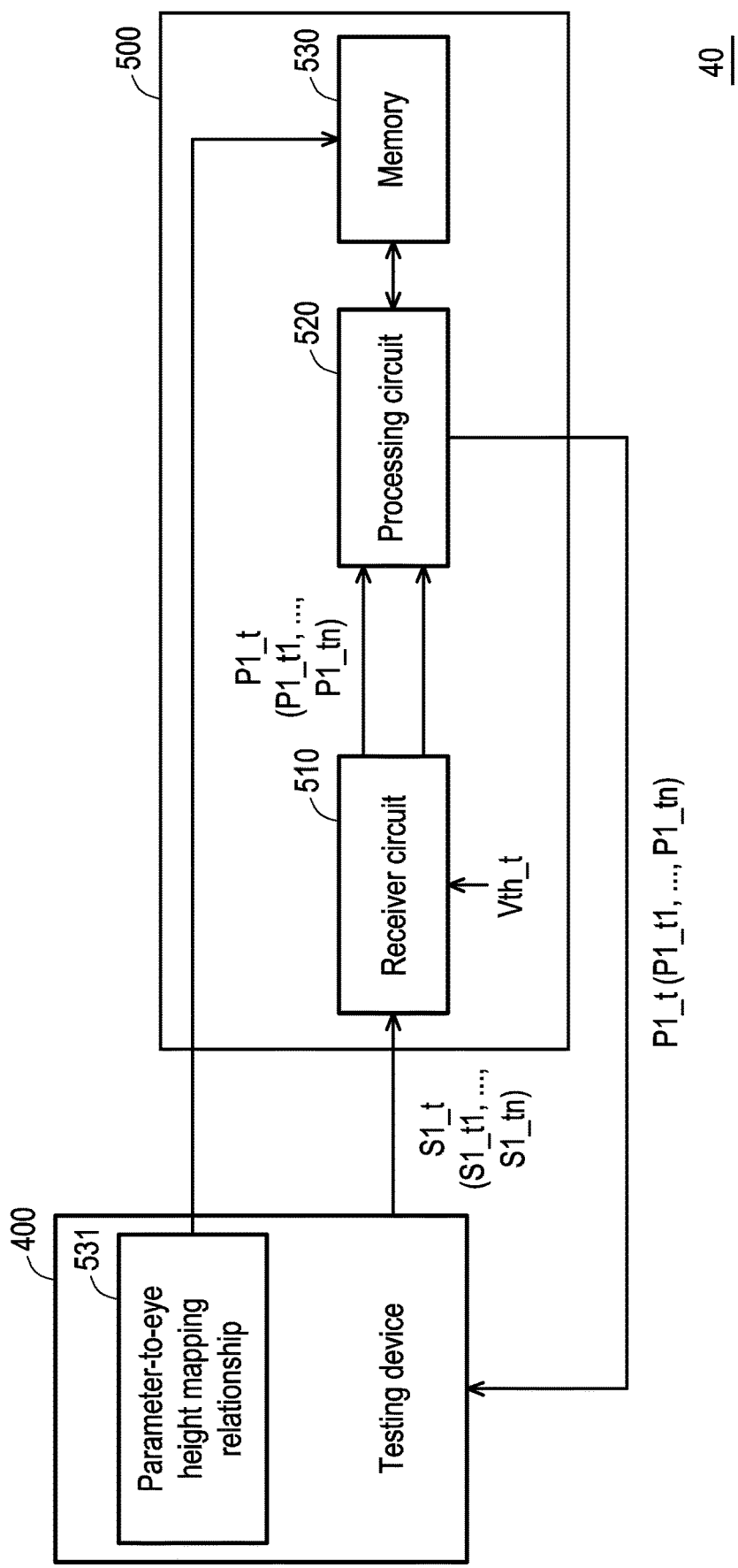
FIG. 4 is a schematic diagram of a circuit block of a testing system according to an embodiment of the disclosure.

FIG. 4 is a schematic diagram of a circuit block of a testing system according to an embodiment of the disclosure. A testing system 40 shown in FIG. 4 includes a testing device 400 and a sample to be tested (for example, the integrated circuit 500). The integrated circuit 500 may operate in the normal working mode. For the operation of the integrated circuit 500 in the normal working mode, reference may be made to the relevant description of the integrated circuit 100 in the embodiments shown in FIG. 1 to FIG. 3. The integrated circuit 500 is coupled to the testing device 400. In the embodiment, the integrated circuit 500 may operate in the test mode and may operate in cooperation with the testing device 400 to conduct a test according to a test signal S1_t conforming to the high-speed transmission standard, and establish a parameter-to-eye height mapping relationship 531. For the parameter-to-eye height mapping relationship 531 shown in FIG. 4, reference may be made to the relevant description of the parameter-to-eye height mapping relationship 131 shown in FIG. 1, and (or) for the parameter-to-eye height mapping relationship 131 shown in FIG. 1, reference may be made to the relevant description of the parameter-to-eye height mapping relationship 531 shown in FIG. 4.

In the embodiment shown in FIG. 4, the integrated circuit 500 includes a receiver circuit 510, a processing circuit 520, and a memory 530. The integrated circuit 500, the receiver circuit 510, the processing circuit 520, the memory 530, and the test signal S1_t shown in FIG. 4 may be analogized with reference to the relevant description of the integrated circuit 100, the receiver circuit 110, the processing circuit 120, the memory 130, and the communication signal S1 shown in FIG. 1, so there is no repetition here.

Figure 5:
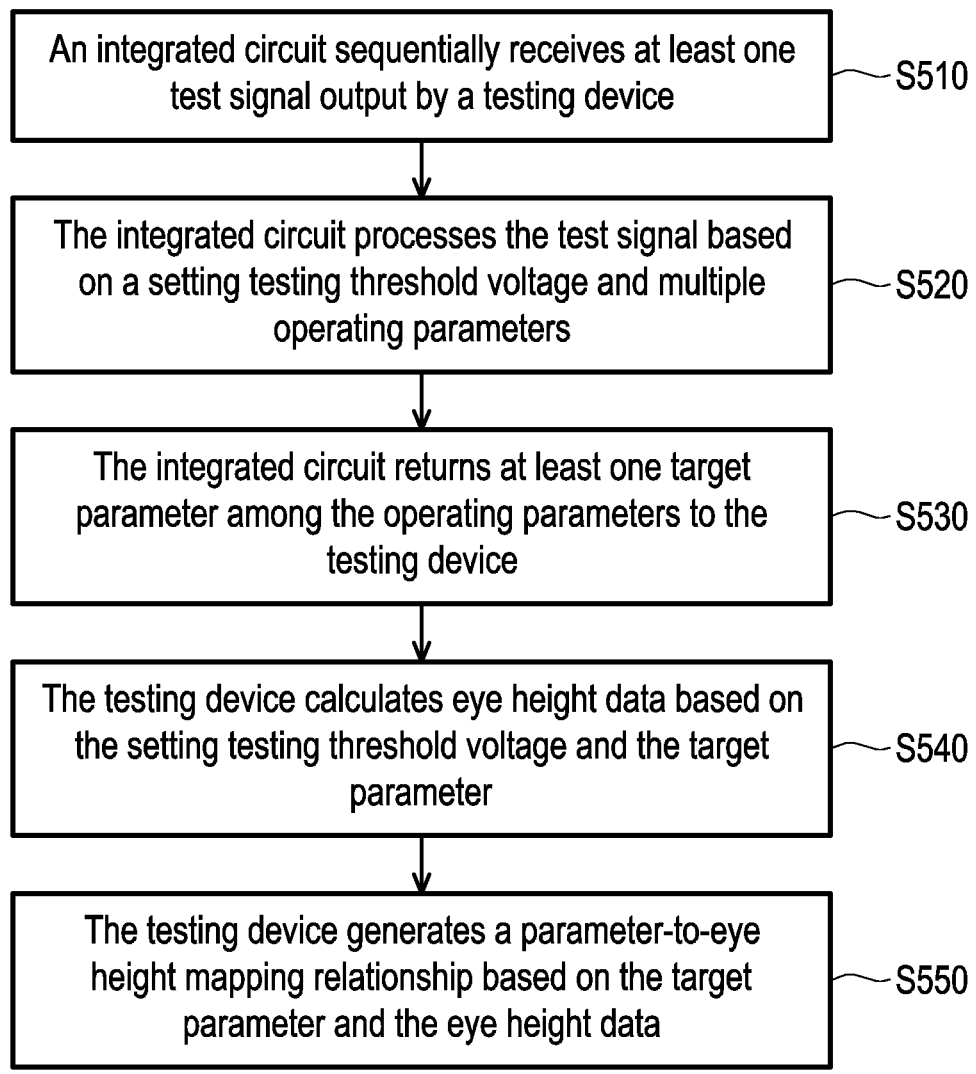
FIG. 5 is a schematic flowchart of an operating method of a testing system according to an embodiment of the disclosure.

FIG. 5 is a schematic flowchart of an operating method of a testing system according to an embodiment of the disclosure. Please refer to FIG. 4 and FIG. 5. The testing system 40 may execute Steps S510 to S550 below. In Step S510, the receiver circuit 510 of the integrated circuit 500 may sequentially receive at least one test signal S1_t output by the testing device 400. For example, the test signal S1_t may include multiple input signals S1_t1, . . . , S1_tn with different eye heights, so that the integrated circuit 500 may sequentially receive and process the input signals S1_t1 to S1_tn. The testing device 400 may provide the input signal S1_t1 to the integrated circuit 500 at time t1. By analogy, the testing device 400 may provide the input signal S1_tn to the integrated circuit 500 at time tn.

In Step S520, the receiver circuit 510 of the integrated circuit 500 may process the test signal S1_t based on a setting testing threshold voltage Vth_t and multiple operating parameters (not shown in FIG. 4) to perform filtering, equalization, amplification, data restoration, and/or other operations on the test signal S1_t, and the operating parameters may include a filtering parameter, an equalization parameter, a gain parameter, a data restoration parameter, and/or other operating parameters. In the embodiment, the setting testing threshold voltage Vth_t may be, for example, a reference voltage set by the testing device 400. For example, the testing device 400 may set the setting threshold voltage Vth to 300 mV or other reference voltage levels. The receiver circuit 510 may dynamically determine the gain parameter and/or the equalization parameter based on the setting testing threshold voltage Vth_t, and process the test signal S1_t with the gain parameter and/or the equalization parameter.

In detail, the receiver circuit 510 of the integrated circuit 500 may dynamically determine at least one target parameter P1_t among the operating parameters based on the test signal S1_t and the setting testing threshold voltage Vth_t. For example, the testing device 400 may provide the input signal S1_t1 to the receiver circuit 510 at time t1, and the receiver circuit 510 dynamically determines the target parameter P1_t as a corresponding value P1_t1 based on the input signal S1_t1 and the setting testing threshold voltage Vth_t. By analogy, the testing device 400 may provide the input signal S1_tn to the receiver circuit 510 at time tn, and the receiver circuit 510 dynamically determines the target parameter P1_t as a corresponding value P1_tn based on the input signal S1_tn and the setting testing threshold voltage Vth_t. In the embodiment, since the input signals S1_t1 to S1_tn have different eye heights, the receiver circuit 510 may dynamically adjust the value (that is, different corresponding values P1_t1 to P1_tn) of the target parameter P1_t to respectively process the input signals S1_t1 to S1_tn.

In Step S530, the integrated circuit 500 may return at least one target parameter P1_t among the operating parameters to the testing device 400. Specifically, the processing circuit 520 of the integrated circuit 500 obtains at least one target parameter P1_t among the operating parameters of the receiver circuit 510, and transmits the target parameter P1_t to the testing device 400. Specifically, the testing device 400 may provide the input signal S1_t1 to the receiver circuit 510 at time t1, and at this time the processing circuit 520 obtains the corresponding value P1_t1 of the target parameter P1_t of the receiver circuit 510, and the processing circuit 520 returns the corresponding value P1_t1 corresponding to the input signal S1_t1 to the testing device 400. By analogy, the testing device 400 may provide the input signal S1_tn to the receiver circuit 510 at time tn, and at this time the processing circuit 520 obtains the corresponding value P1_tn of the target parameter P1_t of the receiver circuit 510, and the processing circuit 520 returns the corresponding value P1_tn corresponding to the input signal S1_tn to the testing device 400.

In Step S540, the testing device 400 may calculate the eye height data based on the setting testing threshold voltage Vth_t and the target parameter P1_t corresponding to the test signal S1_t. In Step S550, the testing device 400 may generate the parameter-to-eye height mapping relationship 531 based on the target parameter P1_t and the eye height data. For details of Step S540 and Step S550, please refer to the following content about the parameter-to-eye height mapping relationship 531 for description. In addition, the testing device 400 may transmit the parameter-to-eye height mapping relationship 531 to the memory 530 and record the parameter-to-eye height mapping relationship 531 in the memory 530. The parameter-to-eye height mapping relationship 531 stored in the memory 530 may be used in the normal working mode.

In the embodiment, the parameter-to-eye height mapping relationship 531 may be implemented as a lookup table corresponding to the setting testing threshold voltage Vth_t. For example, Table (2) below may be used as a specific example of the lookup table. The lookup table shown in Table (2) includes an eye height data column of the test signal S1_t, an operating parameter column, and an eye height data column of a signal processed by the integrated circuit 500. Values shown in the eye height data column of the test signal S1_t shown in Table (2) represent eye height values of the input signals S1_t1 to S1_tn. Values shown in the operating parameter column shown in Table (2) represent the target parameters returned by the integrated circuit 500, that is, the corresponding values P1_t1 to P1_tn of the target parameter P1_t of the receiver circuit 510. Values shown in the eye height data column of the signal processed by the integrated circuit 500 shown in Table (2) represent values of the eye height data of the input signal processed by the integrated circuit 500. The data structure, the number of fields, and the number of values in each field of Table (2) are exemplary only and are not limited thereto.

TABLE 2

Specific example of lookup table

| Eye height data column of test signal (unit: mV) | Operating parameter column | Eye height data column of signal processed by integrated circuit (unit: mV) |
| --- | --- | --- |
| 700 | 15 | 544 |
| 600 | 17 | 444 |
| 500 | 19 | 344 |
| 400 | 25 | 244 |
| 300 | 31 | 144 |

The following embodiments are illustrated with Table (2). The testing device 400 may provide the input signal S1_t1 with an eye height of 700 mV to the receiver circuit 510 at time t1, and at this time the processing circuit 520 obtains the corresponding value P1_t1 of the target parameter P1_t of the receiver circuit 510 as "15", and the processing circuit 520 returns the corresponding value of "15" to the testing device 400. By analogy, the testing device 400 may respectively provide input signals with eye heights of 600 mV, 500 mV, 400 mV, and 300 mV to the receiver circuit 510 at time t2, t3, t4, and t5, and the processing circuit 520 returns the corresponding values of "17", "19", "25", and "31" of the target parameter of the receiver circuit 510 to the testing device 400, as shown in Table (2). The testing device 400 calculates the corresponding eye height data based on a target corresponding value (for example P1_t5) among the corresponding values P1_t1, . . . , P1_t5 and the setting testing threshold voltage Vth_t. For example, the testing device 400 may simulate the eye height data of "144" using the corresponding value of "31" in the operating parameter column and the setting testing threshold voltage Vth_t. In the embodiment, the target corresponding value of "31" may be, for example, a parameter value of the receiver circuit 510 operating in a saturated state, that is, "31" is the maximum value of the target parameter. In some other embodiments, the target corresponding value may be, for example, a randomly selected corresponding value (for example, any row of data in the operating parameter column shown in Table (2)).

Continuing the above description, the testing device 400 may infer multiple other eye height data of 244 mV, 344 mV, 444 mV, and 544 mV corresponding to multiple other corresponding values (that is, other corresponding values P1_t1 to P1_t4 excluding the target corresponding value P1_t5) among the corresponding values P1_t1, . . . , P1_t5 from the eye height data of "144" obtained by the simulation based on the size relationship between the eye heights of 700 mV, 600 mV, 500 mV, 400 mV, and 300 mV in the eye height data column of the test signal S1_t, as shown in Table (2). Therefore, for the operating condition of the setting testing threshold voltage Vth_t, the testing device 400 may obtain the mapping (or correspondence) relationship between the data shown in the eye height data column of the test signal and the data shown in the eye height data column of the signal processed by the integrated circuit, and the mapping (or correspondence) relationship between the data shown in the operating parameter column and the data shown in the eye height data column of the signal processed by the integrated circuit. In other words, in the embodiment, the parameter-to-eye height mapping relationship 531 includes the mapping relationship between the target corresponding value P1_t5 and the eye height data (that is, the value of 144), and the mapping relationship between the other corresponding values P1_*t*1 to P1_*t*4 and the other eye height data (that is, the values of 244 to 544).

In some embodiments, the testing device 400 may transmit the operating parameter column in the parameter-to-eye height mapping relationship 531 and the eye height data column of the signal processed by the integrated circuit 500 to the integrated circuit 500 as the lookup table (for example, the parameter-to-eye height mapping relationship 131 shown in FIG. 1). In some other embodiments, the testing device 400 may convert the operating parameter column in the parameter-to-eye height mapping relationship 531 and the eye height data column of the signal processed by the integrated circuit 500 into at least one equation corresponding to the setting testing threshold voltage Vth_t, such as the equations shown in Formula (1) to Formula (3) above, and then transmit the equations to the integrated circuit 500. The parameter-to-eye height mapping relationship 531 may be analogized with reference to the relevant description of the parameter-to-eye height mapping relationship 131, so there is no repetition here.

Figure 6:
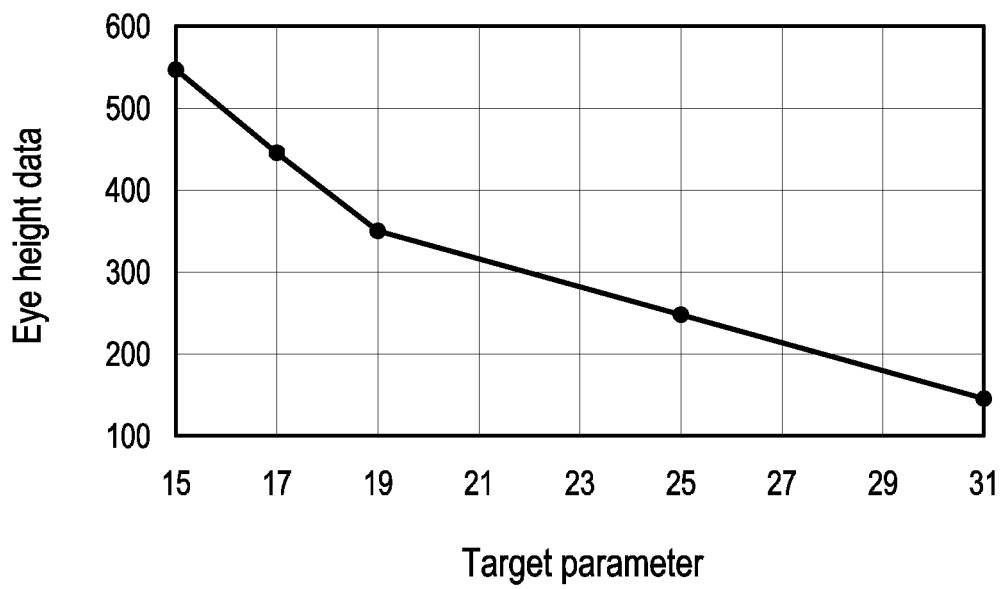
FIG. 6 is a schematic diagram of a parameter-to-eye height mapping relationship according to an embodiment of the disclosure.

Please refer to FIG. 6 together. FIG. 6 is a schematic diagram of a parameter-to-eye height mapping relationship according to an embodiment of the disclosure. The horizontal axis (that is, the x-axis) shown in FIG. 6 shows the corresponding values P1_*t*1, . . . , P1_15 of the target parameter P1_*t*, and the vertical axis (that is, the y-axis) shows the values of the eye height data of the processed input signals S1_*t*1, . . . , S1_*t*5. The schematic diagram shown in FIG. 6 may correspond to Table (2) and Formula (1) to Formula (3), all of which are used to represent the mapping relationship between the target parameter P1_*t* and the eye height data.

It is worth mentioning here that processing the test signal S1_*t* with multiple operating parameters in the test mode through the integrated circuit 500, and calculating the target parameter P1_*t* among the operating parameters and the test signal S1_*t* through the testing device 400 to generate the parameter-to-eye height mapping relationship 531 can enable the integrated circuit to report the receiver margin M1 based on the parameter-to-eye height mapping relationship 531 in the normal working mode, so as to avoid an additional detection circuit (an additional receiver circuit) to detect the receiver margin of the integrated circuit 500 for the test signal S1_*t*. In this way, the integrated circuit 500 and/or the testing device 400 may reduce the circuit configuration for providing the receiver margin, and can reduce the capacitive load on the transmission path of the test signal S1_*t* during a test operation to improve the working performance, so as to save the power consumption and reduce the cost.

The receiver circuit 510 shown in FIG. 4 may be analogized with reference to the relevant description of the receiver circuit 110 shown in FIG. 3. For example, the receiver circuit 510 of the integrated circuit 500 shown in FIG. 4 may include a linear equalizer, a gain amplifier, a buffer, and a CDR circuit. In the embodiment shown in FIG. 4, the operating parameters of the receiver circuit 510 further include an equalization parameter of the linear equalizer. The linear equalizer may perform an equalization operation based on the equalization parameter. In some embodiments, the processing circuit 520 may obtain the equalization parameter of the receiver circuit 510 as the target parameter P1_*t*, and return the target parameter P1_*t* to the testing device 400. The testing device 400 may calculate the eye height data based on the setting testing threshold voltage Vth_t and the target parameter P1_*t* corresponding to the test signal S1_*t*.

In some embodiments, the operating parameters of the receiver circuit 510 may further include a gain parameter of the gain amplifier. The gain amplifier may dynamically determine the gain parameter corresponding to the test signal S1_*t* according to the setting testing threshold voltage Vth_t. The processing circuit 520 may obtain the gain parameter of the receiver circuit 510 as the target parameter P1_*t*, and return the target parameter P1_*t* to the testing device 400. The testing device 400 may calculate the eye height data based on the setting testing threshold voltage Vth_t and the target parameter P1_*t* corresponding to the test signal S1_*t*.

In summary, the integrated circuit and the operating method thereof according to the embodiments of the disclosure can provide the receiver margin to the host based on the pre-established "parameter-to-eye height mapping relationship". In the normal working mode, the integrated circuit may process the communication signal from the host through the same receiver circuit while providing the information (that is, the current parameter of the receiver circuit) about the receiver margin, without setting an additional receiver circuit. In the test mode of the sample to be tested (the integrated circuit), the testing system and the operating method thereof according to the embodiments of the disclosure can establish the "parameter-to-eye height mapping relationship" through a test assignment.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. An integrated circuit, comprising:
   a receiver circuit, used to receive a communication signal output by a host, wherein the receiver circuit processes the communication signal based on a setting threshold voltage and a plurality of current operating parameters; and
   a processing circuit, coupled to the receiver circuit to obtain at least one current parameter among the current operating parameters, wherein when the host inquires the integrated circuit about a receiver margin for the communication signal, the processing circuit obtains eye height data corresponding to the at least one current parameter from a parameter-to-eye height mapping relationship, and returns the receiver margin corresponding to the eye height data to the host.

2. The integrated circuit according to claim 1, wherein the parameter-to-eye height mapping relationship is implemented as a lookup table corresponding to the setting threshold voltage, and the lookup table comprises at least one operating parameter column and an eye height data column.

3. The integrated circuit according to claim 1, wherein the parameter-to-eye height mapping relationship is implemented as at least one equation corresponding to the setting threshold voltage, and the processing circuit substitutes the at least one current parameter into the at least one equation to obtain the eye height data.

4. The integrated circuit according to claim 1, wherein the receiver circuit comprises:
   a linear equalizer, used to receive and equalize the communication signal to generate an equalized signal;
   a gain amplifier, coupled to the linear equalizer to receive the equalized signal, wherein the gain amplifier dynamically determines a gain parameter among the current operating parameters according to a relationship between the equalized signal and the setting threshold voltage, the at least one current parameter comprises the gain parameter, and the gain amplifier amplifies the equalized signal according to the gain parameter; and a clock and data recovery circuit, coupled to the gain amplifier to receive an amplified signal, wherein the clock and data recovery circuit is used to recover data in the amplified signal.

5. The integrated circuit according to claim 4, wherein the current operating parameters further comprise an operating parameter of at least one of the linear equalizer and the clock and data recovery circuit.

6. The integrated circuit according to claim 1, further comprising:

a memory, coupled to the processing circuit and used to store and provide the parameter-to-eye height mapping relationship.

7. An operating method of an integrated circuit, comprising:

receiving a communication signal output by a host through a receiver circuit of the integrated circuit;

processing the communication signal based on a setting threshold voltage and a plurality of current operating parameters through the receiver circuit;

obtaining at least one current parameter among the current operating parameters through a processing circuit of the integrated circuit; and when the host inquires the integrated circuit about a receiver margin for the communication signal, obtaining eye height data corresponding to the at least one current parameter from a parameter-to-eye height mapping relationship, and returning the receiver margin corresponding to the eye height data to the host through the processing circuit.

8. The operating method according to claim 7, wherein the parameter-to-eye height mapping relationship is implemented as a lookup table corresponding to the setting threshold voltage, and the lookup table comprises at least one operating parameter column and an eye height data column.

9. The operating method according to claim 7, wherein the parameter-to-eye height mapping relationship is implemented as at least one equation corresponding to the setting threshold voltage, the operating method further comprising:

substituting the at least one current parameter into the at least one equation by the processing circuit to obtain the eye height data.

10. The operating method according to claim 7, further comprising:

equalizing the communication signal through a linear equalizer of the receiver circuit to generate an equalized signal;

dynamically determining a gain parameter among the current operating parameters according to a relationship between the equalized signal and the setting threshold voltage through a gain amplifier of the receiver circuit, wherein the at least one current parameter comprises the gain parameter;

amplifying the equalized signal according to the gain parameter through the gain amplifier to generate an amplified signal; and recovering data in the amplified signal through a clock and data recovery circuit of the receiver circuit.

11. The operating method according to claim 10, wherein the current operating parameters further comprise an operating parameter of at least one of the linear equalizer and the clock and data recovery circuit.

12. The operating method according to claim 7, further comprising:

storing and providing the parameter-to-eye height mapping relationship by a memory of the integrated circuit.

13. A testing system, comprising:

a testing device; and an integrated circuit, coupled to the testing device and used to sequentially receive at least one test signal output by the testing device, wherein the integrated circuit processes the at least one test signal based on a setting testing threshold voltage and a plurality of operating parameters, and returns at least one target parameter among the operating parameters to the testing device, wherein the testing device calculates eye height data based on the setting testing threshold voltage and the at least one target parameter corresponding to the at least one test signal, and generates a parameter-to-eye height mapping relationship based on the at least one target parameter and the eye height data.

14. The testing system according to claim 13, wherein the at least one test signal comprises a plurality of input signals with different eye heights, and the integrated circuit respectively processes the input signals based on the setting testing threshold voltage and a plurality of corresponding values of the at least one target parameter.

15. The testing system according to claim 14, wherein the integrated circuit returns the corresponding values corresponding to the input signals to the testing device, the testing device calculates the eye height data based on a target corresponding value among the corresponding values and the setting testing threshold voltage, the testing device infers a plurality of other eye height data corresponding to a plurality of other corresponding values among the corresponding values from the eye height data based on a relationship between the input signals, the parameter-to-eye height mapping relationship comprises a mapping relationship between the target corresponding value and the eye height data and a mapping relationship between the other corresponding values and the other eye height data, and the testing device records the parameter-to-eye height mapping relationship in the integrated circuit.

16. The testing system according to claim 13, wherein the parameter-to-eye height mapping relationship is implemented as a lookup table corresponding to the setting testing threshold voltage, and the lookup table comprises at least one operating parameter column and an eye height data column.

17. The testing system according to claim 13, wherein the parameter-to-eye height mapping relationship is implemented as at least one equation corresponding to the setting testing threshold voltage.

18. The testing system according to claim 13, wherein the integrated circuit comprises:

a receiver circuit, used to sequentially receive the at least one test signal and process the at least one test signal based on the setting testing threshold voltage and the operating parameters; and a processing circuit, coupled to the receiver circuit and the testing device, and used to obtain the at least one target parameter and transmit the at least one target parameter to the testing device.

19. The testing system according to claim 18, wherein the receiver circuit comprises:

a linear equalizer, coupled to the testing device to receive and equalize the at least one test signal to generate an equalized signal;

a gain amplifier, coupled to the linear equalizer to receive the equalized signal, wherein the gain amplifier dynamically determines a gain parameter among the operating parameters according to a relationship between the equalized signal and the setting testing threshold voltage, the at least one target parameter comprises the gain parameter, and the gain amplifier amplifies the equalized signal according to the gain parameter; and a clock and data recovery circuit, coupled to the gain amplifier to receive an amplified signal, wherein the clock and data recovery circuit is used to recover data in the amplified signal.

20. The testing system according to claim 19, wherein the operating parameters further comprise a parameter of at least one of the linear equalizer and the clock and data recovery circuit.

21. The testing system according to claim 13, wherein the integrated circuit further comprises:

a memory, coupled to the testing device and used to store the parameter-to-eye height mapping relationship.

22. An operating method of a testing system, comprising:

sequentially receiving at least one test signal output by a testing device of the testing system through an integrated circuit of the testing system;

processing the at least one test signal based on a setting testing threshold voltage and a plurality of operating parameters, and returning at least one target parameter among the operating parameters to the testing device through the integrated circuit;

calculating eye height data based on the setting testing threshold voltage and the at least one target parameter corresponding to the at least one test signal through the testing device; and generating a parameter-to-eye height mapping relationship based on the at least one target parameter and the eye height data through the testing device.

23. The operating method according to claim 22, wherein the at least one test signal comprises a plurality of input signals with different eye heights, the operating method further comprising:

respectively processing the input signals based on the setting testing threshold voltage and a plurality of corresponding values of the at least one target parameter through the integrated circuit.

24. The operating method according to claim 23, further comprising:

returning the corresponding values corresponding to the input signals to the testing device through the integrated circuit;

calculating the eye height data based on a target corresponding value among the corresponding values and the setting testing threshold voltage through the testing device;

inferring a plurality of other eye height data corresponding to a plurality of other corresponding values among the corresponding values from the eye height data based on a relationship between the input signals through the testing device, wherein the parameter-to-eye height mapping relationship comprises a mapping relationship between the target corresponding value and the eye height data and a mapping relationship between the other corresponding values and the other eye height data; and recording the parameter-to-eye height mapping relationship in the integrated circuit through the testing device.

25. The operating method according to claim 22, wherein the parameter-to-eye height mapping relationship is implemented as a lookup table corresponding to the setting testing threshold voltage, and the lookup table comprises at least one operating parameter column and an eye height data column.

26. The operating method according to claim 22, wherein the parameter-to-eye height mapping relationship is implemented as at least one equation corresponding to the setting testing threshold voltage.

27. The operating method according to claim 22, further comprising:

processing the at least one test signal based on the setting testing threshold voltage and the operating parameters through a receiver circuit of the integrated circuit; and obtaining the at least one target parameter, and transmitting the at least one target parameter to the testing device through a processing circuit of the integrated circuit.

28. The operating method according to claim 27, further comprising:

equalizing the communication signal through a linear equalizer of the receiver circuit to generate an equalized signal;

dynamically determining a gain parameter among the operating parameters according to a relationship between the equalized signal and the setting testing threshold voltage through a gain amplifier of the receiver circuit, wherein the at least one target parameter comprises the gain parameter;

amplifying the equalized signal according to the gain parameter through the gain amplifier to generate an amplified signal; and recovering data in the amplified signal through a clock and data recovery circuit of the receiver circuit.

29. The operating method according to claim 28, wherein the operating parameters further comprise a parameter of at least one of the linear equalizer and the clock and data recovery circuit.

30. The operating method according to claim 22, further comprising:

storing the parameter-to-eye height mapping relationship through a memory of the integrated circuit.

* * * * *